E. H. LUDEMAN.
FLEXIBLE COUPLING.
APPLICATION FILED MAR. 13, 1917. RENEWED JUNE 30, 1919.

1,322,127.

Patented Nov. 18, 1919.
2 SHEETS—SHEET 1.

Inventor
EDWIN H. LUDEMAN

By
Attorney

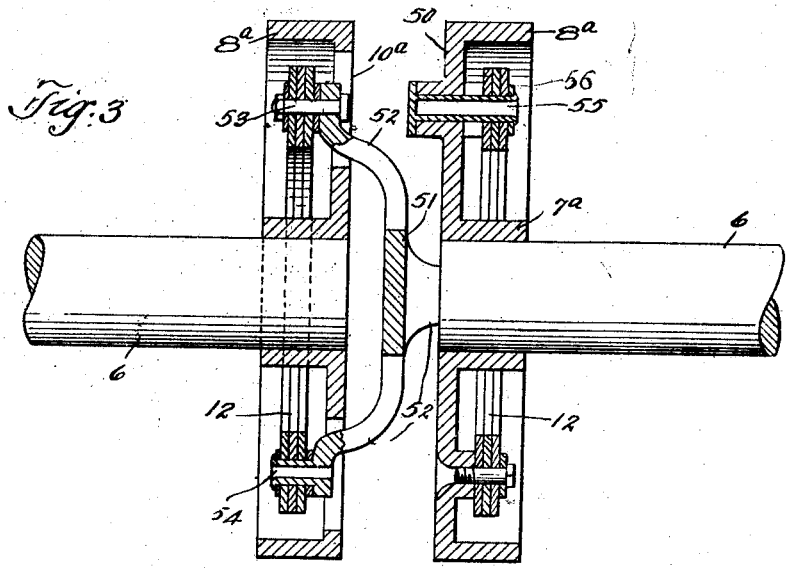
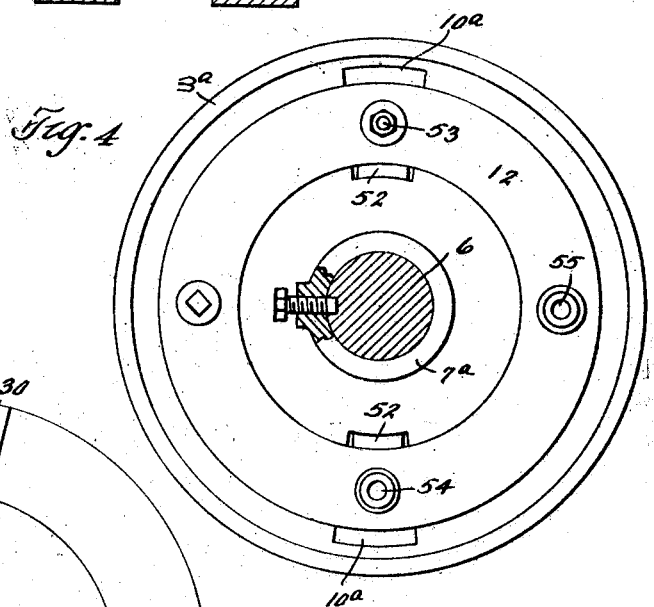
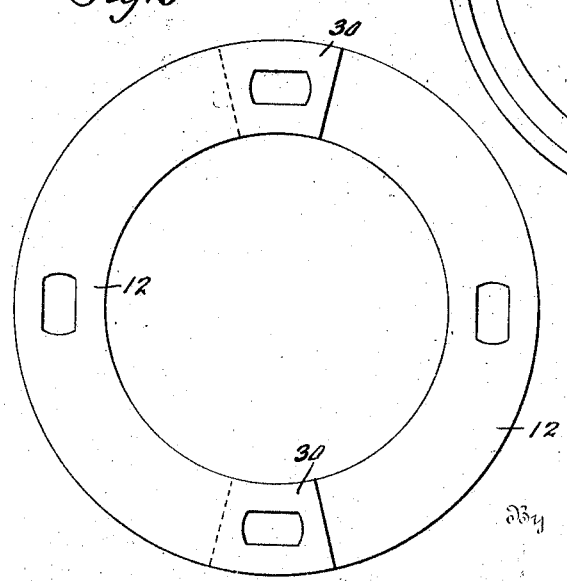

UNITED STATES PATENT OFFICE.

EDWIN H. LUDEMAN, OF NEW YORK, N. Y.

FLEXIBLE COUPLING.

1,322,127.  Specification of Letters Patent.  Patented Nov. 18, 1919.

Application filed March 13, 1917, Serial No. 154,521. Renewed June 30, 1919. Serial No. 307,784.

*To all whom it may concern:*

Be it known that I, EDWIN H. LUDEMAN, a citizen of the United States, residing at New York, in the county of New York and State of New York, have invented certain new and useful Improvements in Flexible Couplings, of which the following is a specification.

This invention relates to flexible couplings adapted and intended for connecting shaft sections for the transmission of power. The local conditions under which said couplings are often used demand certain functions or structures which exclude various devices which might otherwise be available. Thus it is essential or desirable that the coupling occupy but little space axially, as the shaft sections and bearings of various machines or combinations of units are placed close up, with only a limited space for the coupling. Also it is desirable in many installations to permit the shafts, in addition to the ordinary angular variations, to assume a position out of center, that is with their axes offset. This latter condition often results from unequal expansion or wear of metal parts, and usually demands an intermediate or middle member between the heads fixed to the shaft sections, and this intermediate member cannot take up any considerable amount of space because of the necessity for the close location of the shaft sections, as above referred to. It is also desirable that a coupling be constructed which permits the parts to be readily replaced or repaired, without taking down the shafts, and this is particularly true of couplings using flexible or laminated rings to transmit the power and permit the angular and other variations. Cheapness is also desirable and is accomplished by a construction permitting the use of stamped metal members.

The present invention is intended to satisfy the above and other desirable conditions, and it includes the idea, among others, of placing flexible or laminated rings or other members on the outer or rear side of the heads or members attached to the shafts, as distinguished from placing them between the adjacent faces of said heads or members. This saves space and permits the rings to be readily got at. Also by making the rings sectional, they can be taken off and replaced without disturbing the other parts and without decreasing the available hub room for attaching the heads to the shafts. Improved means are also provided for connecting the rings to the heads and the intermediate member, if the latter is used.

Figure 1:
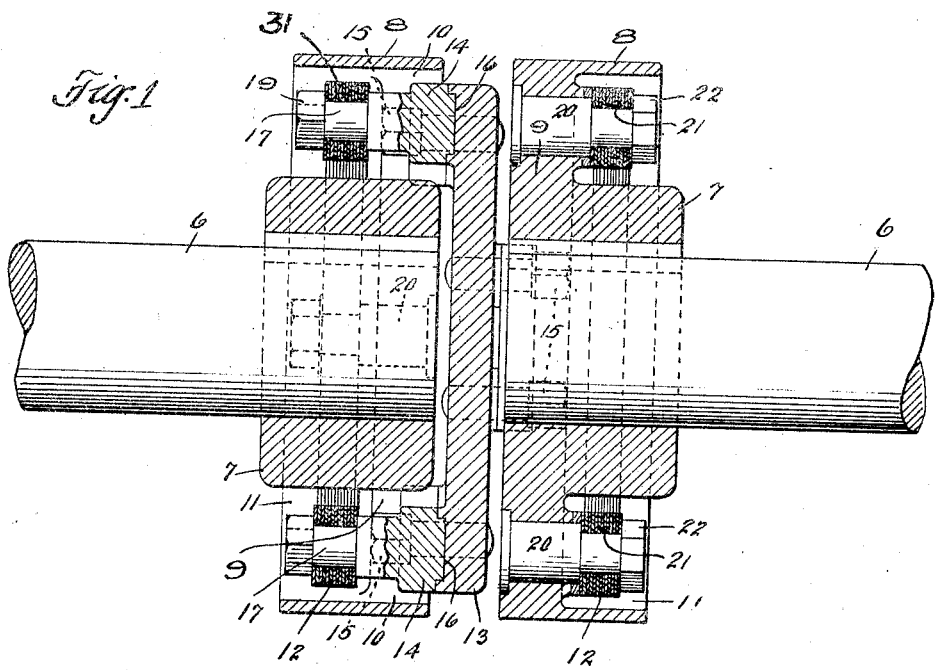
Figure 2:
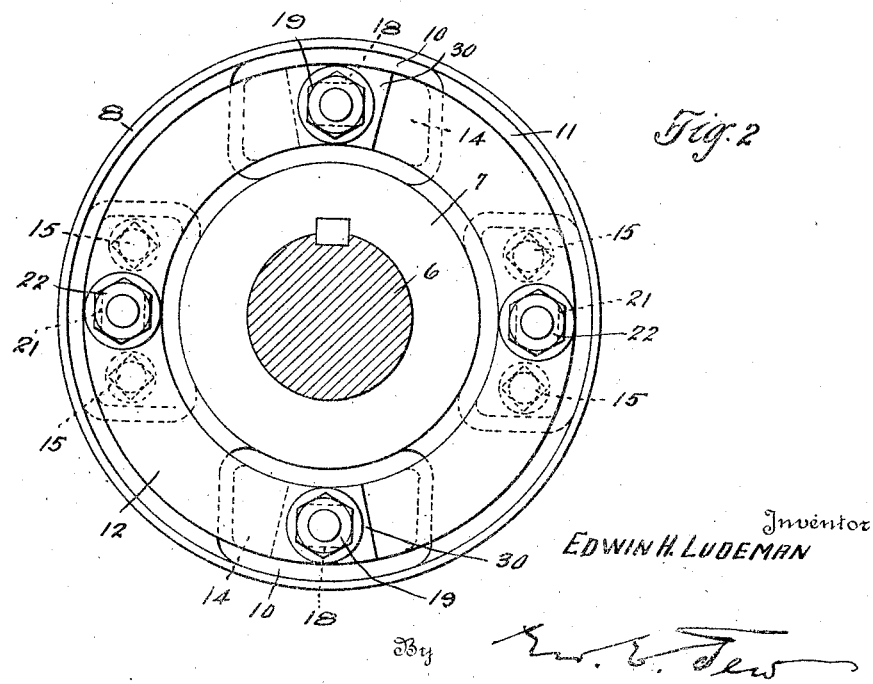

The invention is illustrated in the accompanying drawings in which Figure 1 is a central longitudinal section of a coupling embodying the invention. Fig. 2 is an end elevation thereof. Fig. 3 is a section of a stamped metal coupling. Fig. 4 is an end elevation of the same. Fig. 5 is a detail of the sectional rings.

Referring specifically to the drawings, 6 indicates the adjacent shaft sections to which the coupling is applied. Upon each of these sections is keyed or otherwise secured a head having a hub 7, a rim 8 and a connecting web 9. This web has recesses through the same, indicated at 10, and the web is preferably located at or near the front face of the head, that is the face toward the end of the shaft section, whereby an annular channel 11 is produced in the back part of or side of the head, between the hub and the rim thereof. This channel receives or incloses the flexible member shown as the laminated ring 12 and the means for fastening the same, to be hereafter more fully described.

Between the heads is an intermediate or floating coupling member 13, consisting as shown of a disk, to which is attached four studs or arms 14, two of which are on each side of the disk, those on each side being arranged diametrically opposite each other, and each pair being located at a right angle to the other, or 90° apart. These studs are fastened to the intermediate member or disk by bolts 15, and the bases of the studs are preferably enlarged and mortised into the disk as indicated at 16, to make rigid joints. If desired the studs may be integral with the disk, but the sectional construction is preferred, for ease of assembling, so that the central member can be removed if desired, without removing the heads. The outer end of each stud is reduced to form a shoulder at 17, and it is also preferably flattened on opposite sides as indicated at 18, in a direction tangential to the circle of rotation, and this flattened part or projection fits in correspondingly shaped holes in the lamina or rings 12. The purpose of this construction is to avoid unduly weakening the rings where they are attached, and to provide sufficient strength in the parts to stand the strain. The rings are clamped to the studs by nuts 19 screwed on the threaded ends of the studs.

The openings 10 in the web of each head are diametrically opposite, and the two heads are set on the shaft sections with the openings spaced at 90 degrees from each other, and the studs 14 project through said openings, which are of sufficient size to permit the desired angular or other variation between the shaft sections. At points alternating and equidistant from the studs 14, the rings are attached to the heads by means of pins 20 set in bores in the webs of the heads, and these pins are reduced and flattened as indicated at 21, where they fit through holes in the rings, in a manner similar to the studs above described, the reduced ends of the pins being threaded to receive nuts 22 whereby the rings are clamped in position. The rings rest against shoulders on the pins, whereby they are spaced from the webs of the heads, to permit flexion.

The rings could be made continuous, but I prefer to make each in two sections, as shown in Fig. 5, each section being sufficiently longer than a half circle to lap at the ends, as indicated at 30, the lapped ends having the holes referred to for the connection of the studs or pins. By this construction the ring sections can be readily put on or taken off without disturbing the heads. As the ends of the sections are lapped, the rings are thereby spaced apart, and serve the same purpose as though washers were used between complete rings, giving increased flexibility. Intermediate the lapped ends, washers 31 are placed between the laminations, to preserve the parallel and spaced relation where the rings are fastened to the intermediate studs. The lapped ends are shown fastened on the pins carried by the heads, with the studs fastened intermediately, but this arrangement may be reversed if desired. By this construction if one or more of the driving rings should be broken they can be readily removed and new ones substituted by merely taking off the nuts 19 and 22.

The intermediate coupling member 13 is shown as a solid disk, but this form can be varied if desired. Thus it may be in the form of a ring, which would permit the shaft ends or the hubs of the heads to project inwardly or closer to each other, if for any reason this were desirable.

Although laminated rings are shown, the invention is not limited thereto, but flexible rings of any kind, or other flexible connecting members, may be substituted, within the scope of the invention. Nor is the invention limited in other respects to the particular structures shown.

In Figs. 3 and 4 a modified form is illustrated. The heads 50 may be stamped from metal, and likewise the intermediate member 51. The former are channeled annularly, producing hubs 7ª, and rims 8ª, the open side or face being at the back, and the webs being provided with openings 10ª. The intermediate member is cross shaped, with opposite arms 52 off-set, a pair on each side, to extend through the openings 10ª, and connected with the laminated rings in any suitable manner, these rings being also connected alternately with the heads and being contained in the channels or recesses thereof. Any suitable connecting means may be used, some of which are illustrated. Thus a bolt 53 may be passed through the rings and the arms; or the rings may be assembled on a hollow rivet, or thimble 54 the end of which is swaged over to hold them. For connection to the head a hollow thimble 55 may be used, set through a boss in the web of the head and riveted over the rings, with a washer 56 interposed. These details are shown for the purpose of illustration or suggestion, the particular means employed being immaterial to the main idea of the invention.

In the devices illustrated four points of connection with each ring are shown, at 90° apart. Obviously this number may be varied, according to the size of the coupling or other conditions, preserving however the alternate arrangement or location of connections to the respective members.

In the use of the device, the rings will yield or bend between connections to permit angular variations of the shafts, and the thrust is communicated lengthwise of the rings, so that a coupling of great strength is provided, without impairing the flexibility permitted cross-wise of the shaft. And, especially when the middle member is used, both rings or sets of rings can be flexed to accommodate any off-set or variation of the shafts from exact alinement.

I claim:

1. In a flexible coupling, the combination of heads in opposite relation, flexible rings at the rear or distant sides of the heads, and attached thereto, and a connecting member between the heads, said member having arms at opposite sides secured in alternation to the respective rings.

2. In a flexible coupling, the combination of heads adapted to be attached in opposite spaced relation to adjacent shaft sections, said heads having annular recesses in their rear or distant faces, flexible members located in said recesses and attached to the heads, and a connecting member between said flexible members.

3. In a flexible coupling, the combination of heads adapted to be attached in opposite spaced relation to adjacent shaft sections, said heads having openings through the same, flexible members located at the rear or distant faces of the heads and attached thereto, and a connecting member between the respective flexible members, extending through the openings in the heads.

4. A flexible coupling comprising two heads adapted for attachment to adjacent shaft sections, and a connection between said heads including flexible members located at the rear or distant faces of said heads and attached at intervals thereto and spaced therefrom for flexion between the points of attachment.

5. A flexible coupling comprising two heads adapted for attachment to adjacent shaft sections, said heads having openings through the same, and connecting means between said heads including rigid members extending through said openings and flexible members attached to the rear or distant faces of said heads.

6. In a flexible coupling, the combination of heads adapted to be attached in opposite relation to adjacent shaft sections, an intermediate member between said heads, and a flexible member located at the rear or distant side of each head and connected alternately to said intermediate member and said head.

7. In a flexible coupling, the combination of heads adapted to be attached to adjacent shaft sections, said heads having openings through the same, an intermediate member between the heads having projections extending through said openings, and a flexible ring secured to said projections and to the heads respectively.

8. In a flexible shaft coupling, the combination of heads adapted to be attached to adjacent shaft sections, an intermediate member between the heads, having projections on opposite sides thereof alternately, and flexible rings attached in alternation to said projections and the rear or distant sides of the respective heads.

9. In a flexible shaft coupling, the combination of heads adapted to be attached to adjacent shaft sections, said heads having openings through the same, an intermediate member between the heads, having projections extending through said openings on opposite sides alternately, and flexible rings attached in alternation to said projections and the respective heads, at the rear or distant sides of said heads.

10. In a flexible coupling, the combination of heads adapted for attachment to adjacent shaft sections, each head consisting of a pressed metal member having a hub, rim and connecting web, forming an annular channel, the web having openings through the same, an intermediate member between the heads having arms projecting on opposite sides through said openings, and flexible rings located in the channels and connected alternately to said arms and to the heads.

11. In a flexible coupling for adjacent shaft sections, the combination with a head on one section, of a flexible ring attached at intervals to the rear side of the head, and a connection between the other shaft section and said ring, attached to the latter at points alternating with the points of attachment of the ring to the head.

12. In a flexible coupling for adjacent shaft sections, the combination with a head on one section, of a flexible ring at the rear side of said head, said ring being connected alternately to the head and to the other shaft section.

13. In a flexible coupling, the combination with members adapted for connection to adjacent shaft sections, of a flexible member comprising a laminated ring, each lamination being made in sections with lapped ends, each section being secured near its ends to one of said members and between those points to the other member.

14. In a flexible shaft coupling, the combination with opposed coupling members adapted for connection to adjacent shaft sections, of a flexible ring composed of laminations, each lamination consisting of segmental sections attached at their ends to one of said members and between said ends to the other member.

In testimony whereof, I affix my signature in presence of two witnesses.

EDWIN H. LUDEMAN.

Witnesses:
DAVID H. REID,
IDA DALCHER.